United States Patent [19]

Bölsing

[11] Patent Number: 5,234,485

[45] Date of Patent: Aug. 10, 1993

[54] METHOD OF IMMOBILIZING CONTAMINANTS IN THE SOIL OR IN MATERIALS SIMILAR TO THE SOIL

[76] Inventor: Friedrich Bölsing, D-3067 Lindhorst, Fed. Rep. of Germany

[21] Appl. No.: 787,701

[22] Filed: Nov. 1, 1991

Related U.S. Application Data

[63] Continuation of Ser. No. 328,253, Mar. 16, 1989, abandoned.

[30] Foreign Application Priority Data

Sep. 24, 1986 [DE] Fed. Rep. of Germany ....... 3632365

[51] Int. Cl.$^5$ .............................................. C05G 3/04
[52] U.S. Cl. ......................................... 71/27; 71/903; 210/702; 210/711; 405/263; 106/900; 588/224
[58] Field of Search .................. 210/702, 711; 71/903, 71/904, 1, 11, 27; 405/263, 264; 106/900; 588/224

[56] References Cited

U.S. PATENT DOCUMENTS 4,636,376 1/1987 Maloney et al. ................ 210/702 X
4,687,505 8/1987 Sylling et al. ..................... 71/903 X

FOREIGN PATENT DOCUMENTS 0228626 7/1987 European Pat. Off. .
2221031 11/1973 Fed. Rep. of Germany .
2434879 4/1984 Fed. Rep. of Germany .
8203415 4/1984 Netherlands .

*Primary Examiner*—Ferris Lander
*Attorney, Agent, or Firm*—Sprung Horn Kramer & Woods

[57] ABSTRACT

A method of immobilizing a contaminant comprising mixing the contaminant with a reaction partner that is capable of chemically interacting with the contaminant to form a water-insoluble reaction product, the reaction partner being mixed in the form of a hydrophobic solid preparation, which is either obtained by grinding the reaction partner with an inert material and treating it with a hydrophobing agent or which contains the educt or reaction product of a dispersion by chemical reaction preliminarily treated with a hydrophobing agent, the mixing being conducted to form a soil or soil-like material with cohesive constituents of a clay-like structure.

9 Claims, No Drawings

METHOD OF IMMOBILIZING CONTAMINANTS IN THE SOIL OR IN MATERIALS SIMILAR TO THE SOIL

This application is a continuation of application Ser. No. 328,253, filed Mar. 16, 1989 and now abandoned.

Converting contaminants that pollute the soil or materials similar to the soil into materials that are ecologically inert in relation to the environment by means of chemical interactions with appropriate reaction partners are known. Such contaminants can be natural or man made. Pot slick, milk of lime, and sedimentation from engineering plants are examples.

These contaminants are either organic or inorganic compounds. The organic compounds can be substituted or unsubstituted, saturated or unsaturated, and aliphatic or aromatic hydrocarbons with or without heteroatoms. The inorganic compounds can for example be cations, in heavy-metal compounds for example, or anions, cyanides for example. All constitute a potential ecological hazard.

The chemical interactions with appropriate reaction partners are for example adsorption, oxidation and reduction, ion exchange, complexing, precipitation, condensation, polymerization, etc.

Examples of the conversion of a contaminant that is potentially hazardous into a material that is ecologically inert in relation to the environment by means of chemical interaction with an appropriate reaction partner are the polymerization of monomers or oligomers in the soil by adding polymerization catalysts, the precipitation of heavy metals in the form of hydroxides in a slime by adding hydroxyl ions, and the adsorption of contaminants in sewage sludge onto sawdust, active carbon, ground bark, etc. Another chemical interaction is the dissolution of a contaminant in a solvent, dissolving chlorobenzene in an asphalt that has been finely divided by chemical reaction in calcium hydroxide and exists in powdered form (dispersion-by-chemical-reaction pulverized asphalt) for instance. The reaction partners are, as will be evident from the examples, added in the form of an aqueous solution, a suspension, or a solid.

This method has several drawbacks. The aqueous solution of a reaction partner can for example be fully effective in a moist soil only subject to certain soil-mechanical conditions.

A homogeneously sandy soil contaminated with heavy metals can be treated in the present context for instance by spraying it with an aqueous solution of a sulfide. It is known that heavy-metal sulfides are practically insoluble and are accordingly ecologically inert in relation to the environment. As the solution seeps into the soil, then, practically all the heavy-metal ions in the sandy soil are reached by the reaction partner, the sulfide ion, and precipitate out in the form of heavy-metal sulfide.

Sometimes, on the other hand, the soil contains cohesive constituents. In the present example, that is, the sand can be interspersed with coarse or fine clay. Such substances will prevent the heavy metals from reacting with the sulfide ion in the aqueous solution and the metals will remain just as potentially hazardous to the environment as ever.

Whether the contaminated soil is treated in situ or after being dumped into appropriate mixing equipment is insignificant because plastic clods of coarse and fine clay will persevere very extensively throughout the mixing procedure.

There exists an additional hazard. The added sulfide ions that cannot get to the heavy-metal ions for the aforesaid reasons and are accordingly themselves prevented from interacting, arrive in the groundwater and become active as a contaminant with a considerable hazardous potential.

The significance of this example can of course be transferred to the other methods of making contaminants inert by means of appropriate reaction partners. Once a contaminated material contains coarse or fine clays, the aforesaid known concept of converting contaminants into materials that are ecologically neutral will fail for the foregoing reasons even though the chemical principles have been thoroughly investigated. These remarks also apply to such other aqueous preparations as suspensions and emulsions. If the aforesaid soil-mechanical conditions are in force, no all-inclusive reaction between the contaminant and its intended reaction partner can occur.

The chemical reaction partner can be added in the form of a solid or solid preparation to a moist soil. Such solids are for example sawdust, hydraulic binders, etc. In this case, the solid, which can absorb water, will be observed to cake up and become lumpy, preventing the homogeneous distribution of the actual reaction partner contained therein throughout the moist soil. This situation will be even more likely to occur when the composition of the material being treated is inhomogeneous, when, that is, it contains structures of the nature of coarse or fine clay.

Finally, there is still another and quite considerable drawback. The constituents of aqueous or solid preparations of reaction partners and of solid reaction partners that can be mixed or soaked with water can separate when the substances are introduced into a moist material that is to be treated. The phenomena are similar to those that occur in chromatography, with the individual constituents of the system containing the reaction partners being separated to the extent that they cannot act together effectively at the site of the contaminant.

German A 2 434 879 discloses the use of thiuram-sulfide compounds to remove heavy metals from an environment polluted by them. The process is especially applicable to sewage, exhaust gases, polluted rivers and seas, and polluted terrain. When the process is applied to soil that has been polluted with heavy metals, the heavy-metal compounds must be leached out and transferred to aqueous systems before they can be precipitated in the form of water-insoluble reaction products.

In methods with the characteristics recited in the preamble to the major claim of German A 24 34 879, however, a contaminant that has been converted into a water-insoluble reaction partner is to be retained in the soil. This would be impossible with the known heavy-metal remover because the resulting water-insoluble reaction products are sensitive to hydrolysis. The thiuram-sulfide compounds behave no differently in the soil than other known reaction partners known for converting heavy metals. The specific problems that occur with a soil or soil-like material that contains cohesive constituents, especially structures like coarse or fine clay, cannot be solved by the teachings of the aforementioned document.

The object of the invention is accordingly to provide a method that lacks the aforesaid drawbacks and that will ensure the effectiveness of the known chemical interactions between contaminants and appropriate reaction partners even in moist, inhomogeneous, and cohesive structures, leaving the environment unaffected by reaction partners that are prevented from interacting.

This object is attained in accordance with the invention in a method of immobilizing contaminants in the soil or in soil-like materials wherein a reaction partner that is capable of interacting chemically with the contaminant to form a water-insoluble reaction product is worked in the form of a hydrophobic solid preparation into the soil or soil-like material.

Hydrophobic solid preparations are defined for the present purpose as solids that have been treated with a hydrophobing agent and optionally with other auxiliaries as well.

Appropriate hydrophobing agents are known. Biodegradable agents are preferably employed. These are for example such natural fatty acids as stearic acid and palmitic acid for instance and such alkanes as paraffin oil for instance.

Enough hydrophobing agents are employed to ensure that, once the finely dispersed hydrophobic solid preparation has been mixed into the soil or soil-like materials, the reaction partners will be released from the interface within a foreseeable time. Depending on the type of hydrophobing agent, it will constitute between 0.1 and 5% of the total mixture. When longer-chain paraffins, alcohols, and carboxylic acids are employed as hydrophobing agents, they will preferably constitute 1% of the total. It is also possible to add up to 20% of such inorganic hydrophobing agents as talc, depending on the solid being hydrophobed.

Solids that can be employed for the purposes of the invention are substances with chemical compositions that allow them to be mixed safely into the soil. These substances can be such inert inorganic solids as finely dispersed silicic acid, powdered limestone, or calcium hydroxide or such silicates as bleaching clay or bentonite.

There are also many organic materials that can be employed as practical inert substances in this context. These materials are ground bark, sawdust, powdered cellulose, active carbon, macromolecular synthetics, solid paraffin, wax, polyethylene glycol, asphalt, etc.

Finally, mixtures of such inorganic and organic constituents as used bleaching clay from the foodstuffs industry can also be employed.

The hydrophobic solid preparation will preferably include the educt or reaction product of a chemical dispersion reaction. Dispersion by chemical reaction, the DCR reaction, is a simple method developed by the present inventor of dividing liquids and solutions of solids or liquids accompanied by the formation of extensive surfaces by means of chemical reaction. DCR is the object of German Patents 2 053 627, 2 328 777, 2 328 778, 2 520 999, 2 533 789, 2 533 790, and 2 533 791, and their foreign equivalents. There are a great many chemical reactions that extend surfaces in the foregoing sense and are accordingly appropriate for chemical dispersion. Especially worth mentioning are the conversion of calcium oxide with water into calcium hydroxide and the hydrolysis of aluminum alcoholates into aluminum hydroxide.

A preferred educt for the DCR method is calcium oxide in the commercially available form of quicklime, in the fine-white chalk grade for example. Coarse grades, however, are also usable in many instances. The quicklime can contain up to 18% of magnesium oxide or other foreign matter by weight.

The DCR method can be carried out by preliminarily dispersing the hydrophobing agent, a reaction partner that is capable of chemically interacting with the contaminant to form a water-insoluble reaction product, and optionally other auxiliaries throughout the DCR educt and then allowing the surface-extending reaction to occur. The result will be finely dispersed solid preparations with the added compounds exhibiting an especially powerful chemical reactivity.

When contaminants in the form of heavy-metal salts are to be treated, the reaction partner that is capable of forming a water-insoluble reaction product is a soluble sulfide, hydroxide, carbonate, or phosphate. Sodium sulfide or calcium sulfide for example can be employed. The latter can be obtained by the DCR method from sulfur in calcium oxide.

In one preferred embodiment, accordingly, calcium oxide is treated, ground for example, with hydrophobing agents and reaction partners and the resulting finely dispersed hydrophobic solid preparation is mixed into the soil or soil-like materials. The calcium oxide will react, although slowly due to the hydrophobing, into calcium hydroxide, which will contain all the added substance is a finely dispersed and accordingly powerfully reactive form.

Chemical reactions of the type described herein occur in aqueous solution. It is accordingly surprising to discover that the reaction partners in the solid preparation will also be released in the soil or soil-like materials when the individual solid particles are hydrophobic.

Just the use of a finely dispersed solid preparation that has been hydrophobed makes it possible to mix it even into moist soil or soil-like materials. The water needed for the dispersion reaction is extracted from the moist soil. Even soils that contain coarse or fine clay can accordingly be homogeneously penetrated by the solid, although the mixing process must last longer. The water of reaction can also be obtained from outside in the form of a reaction partner that is appropriate for immobilization, red mud for example.

How the precipitated heavy-metal compounds behave in the soil depends on the structure and constituents of the soil and on its pH and temperature. Metal sulfides can be microbially oxidized into soluble sulfates at low pH's. Even assuming that an initially present calcium hydroxide will be eventually completely converted into carbonate, the microbial activity will still be inhibited to an extent that can be increased by codispersing agents that suppress the activities of the Thiobacillus strains.

All of the amounts cited in the following examples are by weight.

EXAMPLE 1

1 part of a sandy soil contaminated with approximately 500 000 ppb of hexachlorobenzene in terms of the dry volume was thoroughly mixed with 0.5 parts of a mixture, hydrophobed by milling with 2% of a mixture of natural fatty acids, of 0.7 parts of calcium hydroxide and 0.3 parts of used bleaching clay obtained from the vegetable-oil processing industry. Samples compressed from 50 g of the mixture at $24.5 \cdot 10^5$ Pa and subjected to a leaching test in accordance with German Unit Process (DEV) S4 as necessitated by the method still yield 0.1 ppb of hexachlorobenzene. This level, however, decreases rapidly to zero over three additional leaching steps due to the impoverishment of the contaminant at the surface of the sample.

Instead of the aforesaid mixture, 0.5 parts of a hydrophobic reaction mixture from a dispersion by chemical reaction (DCR) involving 0.5 parts of calcium oxide, 1% of the same mixture of fatty acids, and 0.2 parts of used bleaching clay of the same provenance can be mixed with the soil and with 1.5 times the requisite stoichiometric volume of water. When chlorinated dibenzodioxines are in the soil, it is of advantage to replace the water for the dispersion by chemical reaction with the estimated volume of red mud containing approximately 40% water.

EXAMPLE 2

1 part of a sandy soil contaminated with approximately 500 000 ppb of a contaminant mixture of tri- and tetrachlorobenzolene and penta- and hexachlorobenzene in terms of the dry volume was thoroughly mixed with 0.5 parts of a hydrophobic reaction mixture obtained from a dispersion by chemical reaction involving 0.5 parts of calcium oxide with 1% of a mixture of natural fatty acids and 0.4 parts of molten Type B 80 asphalt and with 1.2 times the requisite volume of water. Samples compressed from 50 g of the mixture at 24.5 $10^5$ Pa and subjected to a leaching test in accordance with German Unit Process (DEV) S4 as necessitated by the method yield no detectable levels of contaminants subject to otherwise identical analytic conditions.

Instead of the aforesaid reaction mixture obtained from the aforesaid dispersion by chemical reaction, it is possible to use a mechanically obtained hydrophobic mixture of the same volume of the same asphalt with 1.5 parts of powdered limestone and optionally with 1 part of a flue ash with hydraulic properties. It is also possible to used appropriate asphaltic wastes instead of the B 80 asphalt. It may be necessary to add other inert materials, in the form of the sandy soil itself for example, to obtain a homogeneous powdered preparation.

One especially simple version of the method consists of grinding asphalt and/or appropriate asphaltic wastes, optionally in liquid form, with an uncontaminated sand at a volumetric ratio that will result in a perceptibly dry preparation that can easily be worked in the sense of the object of the invention and of mixing the preparation with the contaminated sandy soil in a volumetric ratio that will result in a material that can be satisfactorily compacted in accordance with soil-mechanical criteria.

EXAMPLE 3

1 part by weight of a cohesive soil inhomogeneously contaminated with a certain percentage of an unidentifiable mixture of contaminants obtained from the production of different vegetation-protection agents and containing bound mercury in addition to other heavy metals is treated with 0.8 parts of the following mixture.

1 part of B 80 asphalt wa dispersed by chemical reaction with 1 part of calcium oxide and treated with 0.4 parts of powdered limestone enriched with 5% of a finely dispersed calcium sulfide. Compaction results in a soil that is soil-mechanically stable. Samples compressed from 50 g of the mixture at 24.5·$10^5$ Pa and subjected to a leaching test in accordance with German Unit Process (DEV) S4 as necessitated by the method yield no detectable levels of contaminants subject to otherwise identical analytic conditions or when analyzed for mercury and copper or organic compounds containing chlorine.

To control these results, up to 1 million ppb of hexachlorobenzene and $Hg^{2+}$ each were added to reference batches of the same contaminated cohesive soils. Neither contaminant could be detected in leaching tests subject to otherwise identical conditions. The same result is obtained when the sulfur is dispersed by chemical reaction with calcium oxide with molten asphalt and the same procedure is followed.

The dispersion by chemical reaction can also be replaced in this example by such mechanical procedures as grinding for example.

EXAMPLE 4

A mixture is produced from the same number of parts of hydrophobic calcium oxide, into which 1% of calcium sulfide has been ground, and of ground slag obtained from a smelter. 0.8 parts of this mixture are thoroughly mixed with 1 part of a pot slick preliminarily dewatered in a centrifuge and containing organic and inorganic contaminants, especially mercury, arsenic, lead, and cadmium. Upon termination of the dispersion by chemical reaction and subsequent to cooling, the soil-like reaction product can be compacted to make it appropriate from the aspect of soil mechanics and exploited in landscaping for example. Samples compressed from 50 g of the mixture at 24.5·$10^5$ Pa and subjected to a leaching test in accordance with German Unit Process (DEV) S4 as necessitated by the method still release up to 12 ppm of heavy metals, especially lead. As the surface of the sample continues to carbonatize, however, the concentration of heavy metals drops rapidly to zero.

The same result can be attained by using calcium oxide in the form of secondary raw materials obtained from desulfurization plants instead of the commercially available substance or by replacing the powdered slag with used bleaching clay. When samples of the aforesaid composition are embedded in an isolating layer of asphalt dispersed by chemical reaction in calcium hydroxide, asphaltic wastes, or plastic wastes, no detectable concentration of heavy metals or of whatever other problematic organic materials may be present are released in even one leaching step.

It will be understood that the specification and examples are illustrative but not limitative of the present invention and that other embodiments within the spirit and scope of the invention will suggest themselves to those skilled in the art.

What is claimed is:

1. A method of immobilizing a contaminant contained in contaminated soil comprising mixing the contaminated soil with a reaction partner selected from the group consisting of a soluble sulfide, hydroxide, carbonate and phosphate, and which is capable of chemically interacting therewith to form a water insoluble reaction product, the reaction partner being part of a hydrophobic solid preparation which is obtained by
   a) grinding the reaction partner with an inert material and mixing it with a hydrophobizing agent selected from the group consisting of talc, a biodegradable natural fatty acid, long chain paraffin and an alcohol, or
   b) grinding the reaction partner with the product of a dispersing chemical reaction (DCR) selected from the group consisting of calcium hydroxide and aluminum hydroxide and mixing it with a hydrophobizing agent as recited above,
the mixture of the contaminated material with the hydrophobic solid preparation forming an inert solid.

2. A method according to claim 1, wherein the solid preparation is hydrophobized with reaction product of a DCR with a hydrophobic educt.

3. A method according to claim 1, wherein the solid preparation has been hydrophobized in the course of a dispersing chemical reaction.

4. A method according to claim 1, wherein the solid preparation contains the reaction partner in the form of the educt of a dispersing chemical reaction.

5. A method according to claim 1, wherein the solid preparation contains the reaction partner in the form of the reaction product of a dispersing chemical reaction.

6. A method according to claim 1, wherein the solid preparation contains the reaction partner embedded in an inert organic material.

7. A method according to claim 1, wherein the dispersing chemical reaction is carried out with calcium oxide or aluminum alcoholate.

8. A method according to claim 1, wherein the solid preparation contains a reaction partner that immobilizes by precipitation, condensation, dissolution, complexation or addition reactions to form water insoluble reaction products.

9. A method of decontaminating a contaminated soil which comprises immobilizing the contaminants according to the method of claim 1 and subsequently removing the inert solid formed.

* * * * *